United States Patent
Ikeda et al.

(10) Patent No.: US 10,289,046 B2
(45) Date of Patent: May 14, 2019

(54) IMAGE FORMING APPARATUS WITH PERIODIC NON-UNIFORMITY CORRECTION AND COMPUTER-READABLE RECORDING MEDIUM STORING PROGRAM

(71) Applicant: KONICA MINOLTA, INC., Chiyoda-ku, Tokyo (JP)

(72) Inventors: Makoto Ikeda, Hachioji (JP); Shunichi Takaya, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 256 days.

(21) Appl. No.: 15/284,645

(22) Filed: Oct. 4, 2016

(65) Prior Publication Data
US 2017/0102658 A1  Apr. 13, 2017

(30) Foreign Application Priority Data

Oct. 8, 2015 (JP) ................................ 2015-200334

(51) Int. Cl.
G03G 15/00 (2006.01)
H04N 1/047 (2006.01)
H04N 1/06 (2006.01)
G03G 15/16 (2006.01)

(52) U.S. Cl.
CPC ..... G03G 15/5025 (2013.01); G03G 15/1615 (2013.01); G03G 15/5008 (2013.01); G03G 15/5058 (2013.01); H04N 1/0473 (2013.01); H04N 1/0664 (2013.01); H04N 2201/0094 (2013.01)

(58) Field of Classification Search
CPC .......... G03G 15/5025; G03G 15/5008; G03G 15/5058; G03G 15/1615; H04N 1/0473; H04N 1/0664; H04N 2201/0094
USPC .......................................... 399/74
See application file for complete search history.

(56) References Cited

U.S. PATENT DOCUMENTS

2007/0127937 A1   6/2007  Ichikawa et al.
2011/0318065 A1*  12/2011  Shimoda ............ G03G 15/5058
                                                        399/301

(Continued)

FOREIGN PATENT DOCUMENTS

JP    2002-139974 A    5/2002
JP    2007-156192 A    6/2007

(Continued)

OTHER PUBLICATIONS

Office Action (Notification of Reasons for Refusal) dated Aug. 29, 2017, by the Japanese Patent Office in corresponding Japanese Patent Application No. 2015-200334, and an English Translation of the Office Action. (23 pages).

Primary Examiner — Sevan A Aydin
(74) Attorney, Agent, or Firm — Buchahan Ingersoll & Rooney PC

(57) ABSTRACT

With reference to a correction value revision parameter table, a periodic non-uniformity correction value corresponding to changed rotational speed is obtained from the correction value revision parameter table, and set as a new periodic non-uniformity correction value corresponding to the rotational speed of a rotary component, and thereby a gradation which is an image formation parameter of image data is corrected.

6 Claims, 12 Drawing Sheets

(56) References Cited

U.S. PATENT DOCUMENTS

| | | | | |
|---|---|---|---|---|
| 2012/0195650 A1* | 8/2012 | Ogawa | ............... | G03G 15/0189 399/301 |
| 2014/0268242 A1* | 9/2014 | Kaneko | .............. | G06K 15/1881 358/3.06 |
| 2014/0301748 A1* | 10/2014 | Suzuki | ............... | G03G 15/5025 399/49 |

FOREIGN PATENT DOCUMENTS

| JP | 2011-081330 A | 4/2011 |
|---|---|---|
| JP | 2015-090475 A | 5/2015 |

\* cited by examiner

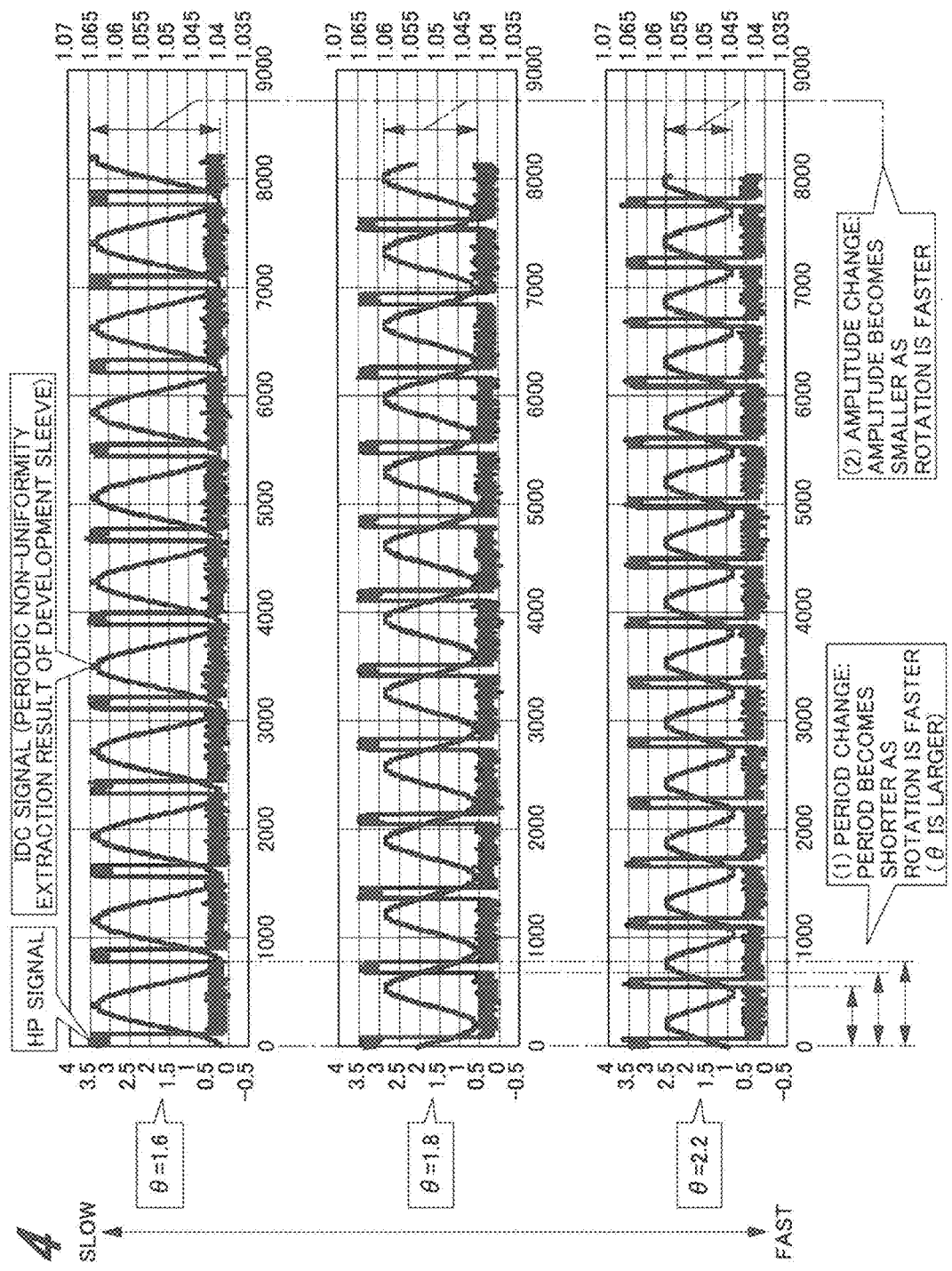

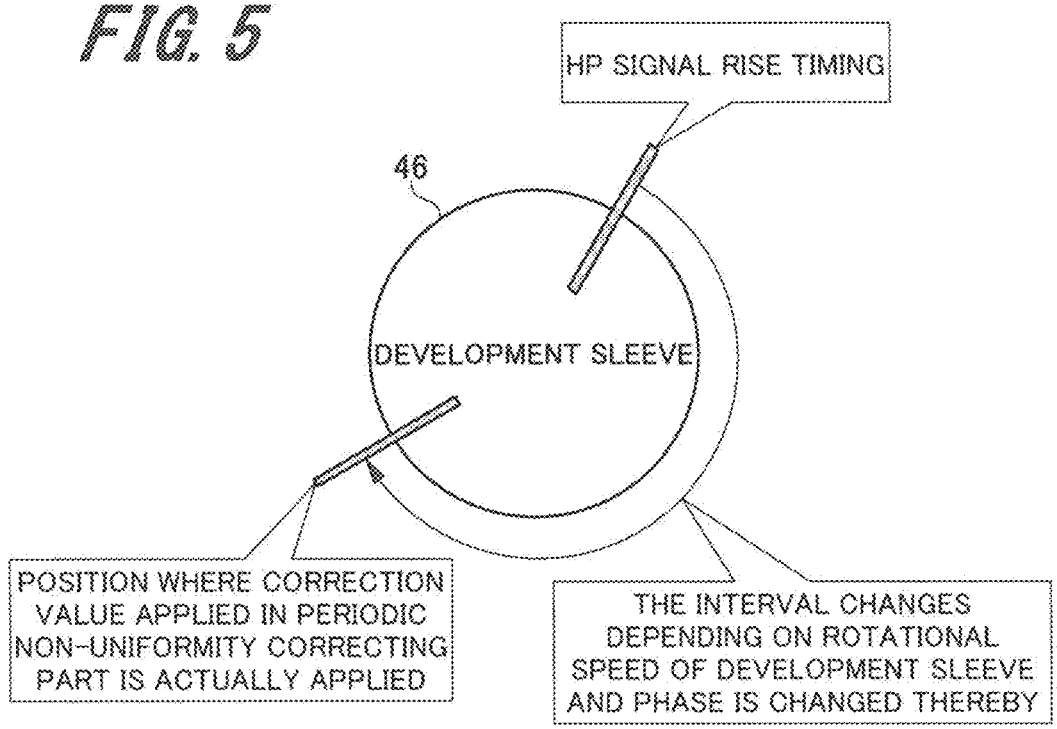

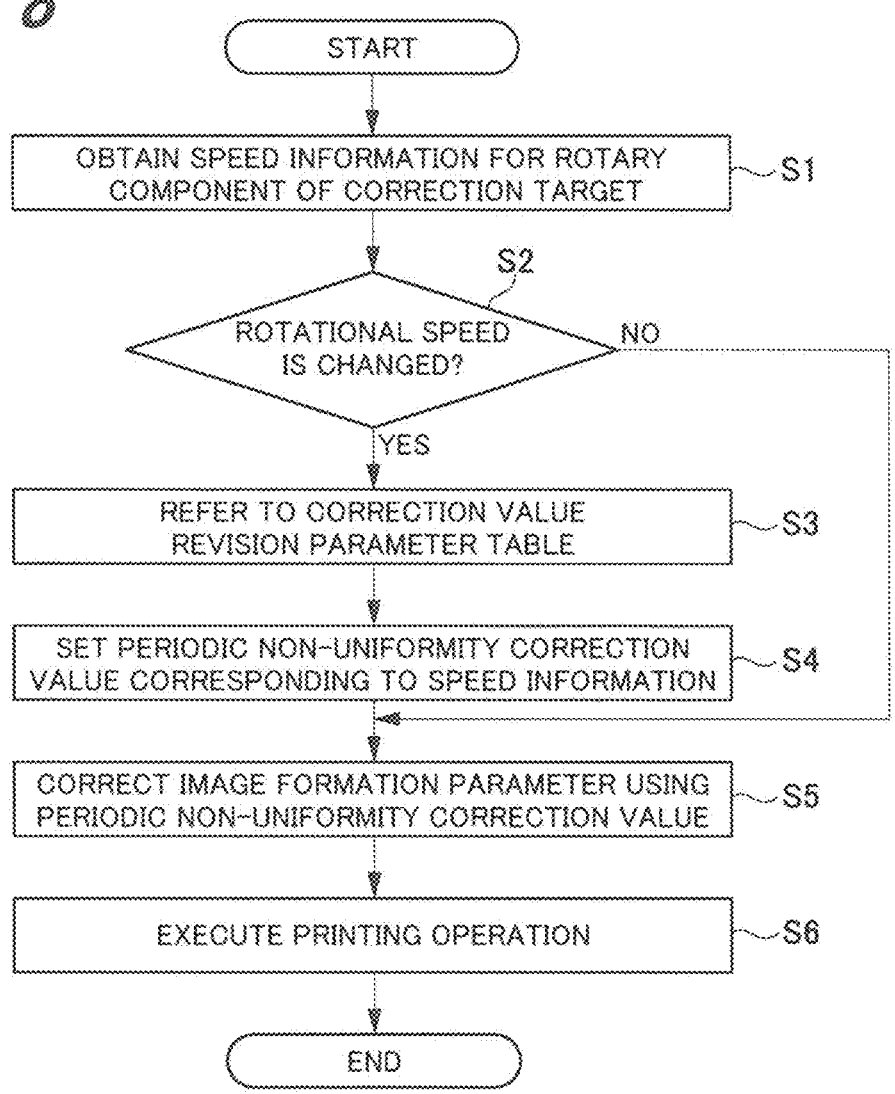

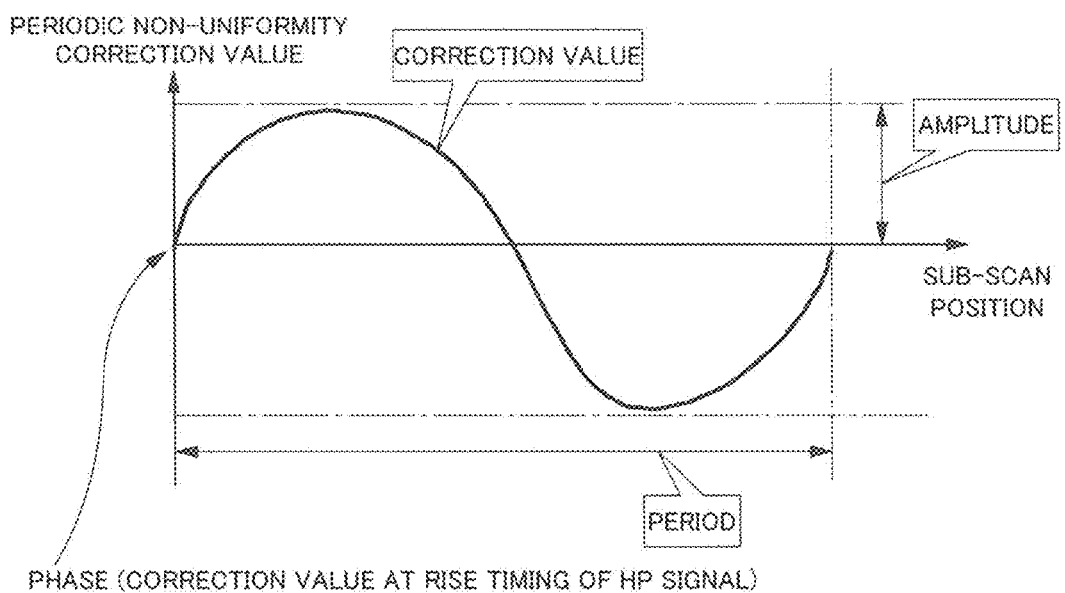

*FIG. 12*

| LINEAR SPEED V | PERIOD | AMPLITUDE | PHASE |
|---|---|---|---|
| V1 | T1 | A1 | X1 |
| V2 | T2 | A2 | X2 |
| V3 | T3 | A3 | X3 |

*FIG. 13A*

| PERIOD | | DEVELOPMENT θ | | |
|---|---|---|---|---|
| | | θ1 | θ2 | θ3 |
| LINEAR SPEED V | V1 | T1 | T4 | T7 |
| | V2 | T2 | T5 | T8 |
| | V3 | T3 | T6 | T9 |

*FIG. 13B*

| AMPLITUDE | | DEVELOPMENT θ | | |
|---|---|---|---|---|
| | | θ1 | θ2 | θ3 |
| LINEAR SPEED V | V1 | A1 | A4 | A7 |
| | V2 | A2 | A5 | A8 |
| | V3 | A3 | A6 | A9 |

*FIG. 13C*

| PHASE | | DEVELOPMENT θ | | |
|---|---|---|---|---|
| | | θ1 | θ2 | θ3 |
| LINEAR SPEED V | V1 | X1 | X4 | X7 |
| | V2 | X2 | X5 | X8 |
| | V3 | X3 | X6 | X9 |

# IMAGE FORMING APPARATUS WITH PERIODIC NON-UNIFORMITY CORRECTION AND COMPUTER-READABLE RECORDING MEDIUM STORING PROGRAM

BACKGROUND OF THE INVENTION

Field of the Invention

The present invention relates to an image forming apparatus and a computer-readable recording medium storing a program.

Description of the Related Art

In an image forming apparatus, for example, an image forming apparatus using an electro-photographic technique (electro-photographic type image forming apparatus), there is a case where periodic density non-uniformity of an image (in the following, called "periodic non-uniformity") is caused in the sub-scan direction (sheet conveyance direction) perpendicular to the main scan direction. This is caused by non-uniformity in a rotation period of a rotary component such as a photoreceptor drum and a development sleeve used in an image generation process.

A technique of detecting the phase in a sub-module of the rotary component causing the periodic non-uniformity, and performing density correction in synchronization with the phase, is known as a technique of correcting the above periodic non-uniformity (refer to Patent Literature 1, for example). The conventional technique is configured to measure a pattern having a uniform gradation in the sub-scan direction, detect currently caused periodic non-uniformity from the measurement result, and generate a correction value from the detection result to apply the correction value to density correction.

RELATED ART DOCUMENT

Patent Document

Patent Literature 1: Japanese Patent Laid-Open Publication No. 2007-156192

DISCLOSURE OF THE INVENTION

Problems to be Solved by the Invention

Meanwhile, the image forming apparatus sometimes performs printing (image formation) by changing the speed of the rotary component inside the apparatus. Examples of the speed control for the rotary component can include linear speed control according to the basic weight of a sheet, development θ control depending on a process state, and the like. Here, the "development θ" is a rotational speed ratio of the rotary component with respect to process linear speed. When such speed control is performed, the periodic non-uniformity caused by the rotary component appears different.

However, the conventional technique described in Patent Literature 1 does not consider the case where printing is performed by changing the speed of the rotary component. Accordingly, when the speed of the rotary component causing the periodic non-uniformity is changed, since the conventional technique applies a correction value before the speed change to the density correction without change, a desirable correction effect is not obtained for the periodic non-uniformity correction.

An object of the present invention is to provide an image forming apparatus and an image forming method which can obtain a desirable correction effect of handling the change of the periodic non-uniformity for the periodic non-uniformity correction, even when the periodic non-uniformity changes accompanying the speed control of the rotary component which is a correction target of the periodic non-uniformity (periodic density non-uniformity).

SUMMARY OF THE INVENTION

Means for Solving the Problem

For the purpose of achieving the above object, an image forming apparatus according to one aspect of the present invention includes:

a density measuring portion configured to measure a periodic density non-uniformity of an image caused in a sub-scan direction perpendicular to a main scan direction;

a reference position detecting portion configured to detect a reference position of a rotary component which is a correction target;

a periodic non-uniformity correction value setting portion configured to set a periodic non-uniformity correction value based on a measurement result of the density measuring portion and a detection result of the reference position detecting portion;

a correction portion configured to correct an image formation parameter using the periodic non-uniform correction value, wherein;

image formation is performed using the image formation parameter corrected by the correction portion, and;

a periodic non-uniformity correction value revising portion configured to revise the periodic non-uniformity correction value when speed of the rotary component is changed, according to the changed speed, wherein;

the image formation is performed using an image formation parameter determined by the periodic non-uniformity correction value after revision in the periodic non-uniformity correction value revising portion.

Further, a computer-readable recording medium storing a program of the present invention stores a computer-readable program in a computer provided for an image forming apparatus:

the image forming apparatus including:

a density measuring portion configured to measure a periodic density non-uniformity of an image caused in a sub-scan direction perpendicular to a main scan direction;

a reference position detecting portion configured to detect a reference position of a rotary component which is a correction target;

a periodic non-uniformity correction value setting portion configured to set a periodic non-uniformity correction value based on a measurement result of the density measuring portion and a detection result of the reference position detecting portion, and;

a correction portion configured to correct an image formation parameter using the periodic non-uniform correction value, wherein;

the computer provided for the image forming apparatus which performs image formation using the image formation parameter corrected by the correction portion, stores;

the computer-readable program causing the computer to execute processing including;

a periodic non-uniformity correction value revision step of revising the periodic non-uniformity correction value when speed of the rotary component is changed, according to the changed speed, and;

an image formation step of using the image formation parameter which is determined by a periodic non-uniformity correction value after revision in the periodic non-uniformity correction value revision step.

When the speed of the rotary component is changed in the above configured image forming apparatus or the computer-readable recording medium storing a program, first, the periodic non-uniformity correction value is revised according to the changed speed. By the revision of the periodic non-uniformity correction value, the image formation parameter determined by the periodic non-uniformity correction value is also revised. Then, by performing the image formation using the image formation parameter which is determined by the periodic non-uniformity correction value after the revision, the periodic non-uniformity correction according to the speed control of the rotary component may be realized.

BRIEF DESCRIPTION OF THE DRAWINGS

FIG. 4 is a waveform chart to show a state in which the period and the amplitude of periodic non-uniformity change in a development sleeve when development θ is changed.

FIG. 5 is a diagram for explaining that a predetermined time is required until data corrected in a correction portion actually reaches a development sleeve which causes periodic non-uniformity.

FIG. 8 is a flowchart to show a series of processing steps in a periodic non-uniformity correction system.

FIG. 9 is a waveform chart to show an example of applying a periodic non-uniformity correction value in synchronization with timing of an HP signal.

FIG. 10 is a diagram to show an example of a correction value revision parameter table.

FIG. 12 is a diagram to show an example of a correction value revision parameter table expressing showing linear speed dependence.

FIGS. 13A-13C are diagrams to show an example of a correction value revision parameter table when development θ change and process linear speed change are combined.

DESCRIPTION OF THE PREFERRED EMBODIMENTS

Hereinafter, a mode for carrying out the present invention (in the following, called "embodiment") will be explained in detail by the use of the drawings. The present invention is not limited to the embodiment, and various kinds of numerical value or the like in the embodiment are exemplifications. Note that the same numeral is used for the same element or an element having the same function in the following explanation and in each of the drawings, and duplicated explanation will be omitted.

[Configuration Example of an Image Forming Apparatus]

Figure 1:
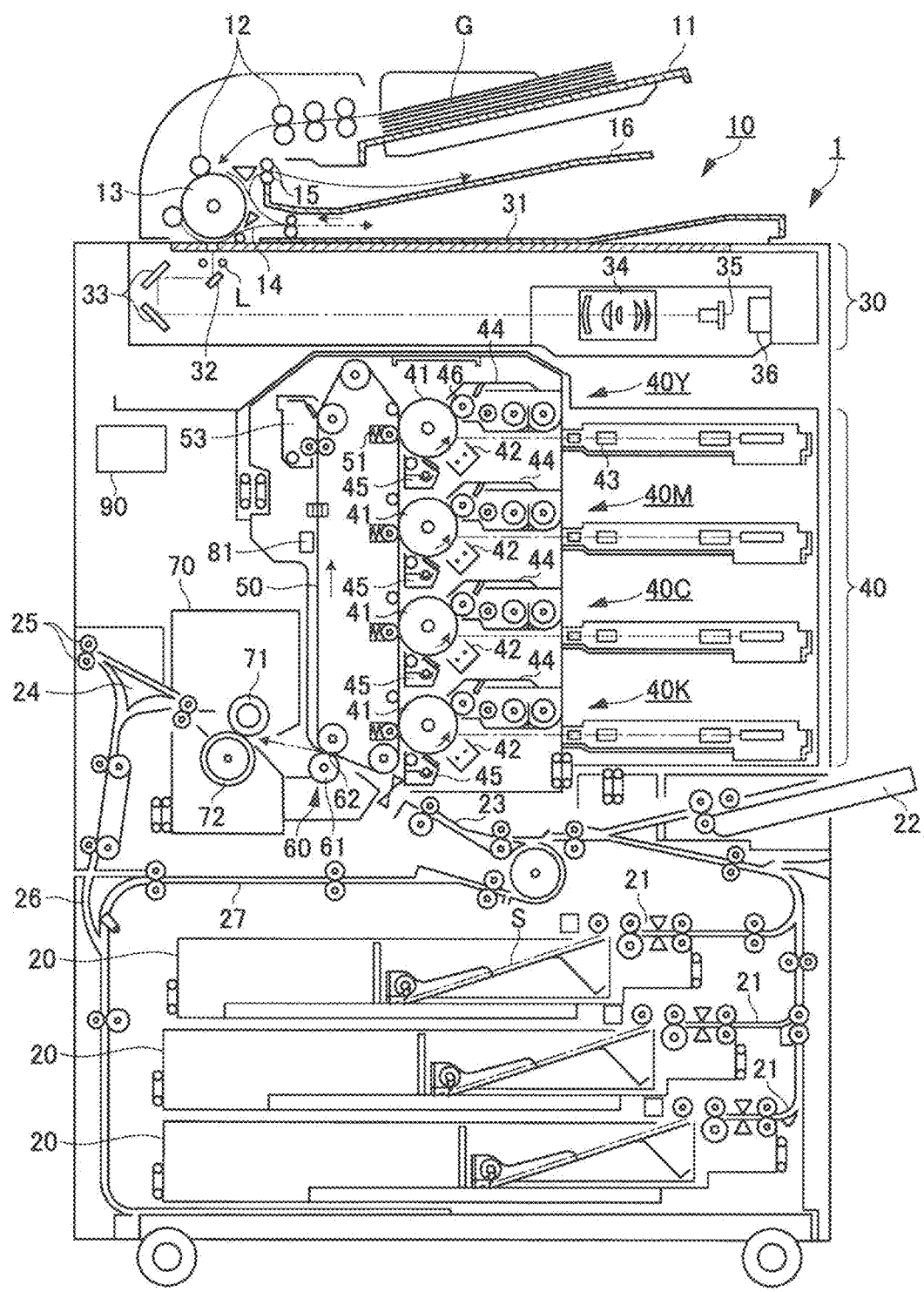
FIG. 1 is a whole configuration view to show a system configuration outline of an image forming apparatus according to an embodiment of the present invention.

FIG. 1 is a whole configuration view to show a system configuration outline of an image forming apparatus according to an embodiment of the present invention. The present embodiment explains the case of application to copy machine as an example.

As shown in FIG. 1, an image forming apparatus 1 according to the present embodiment employs an electrophotographic type which forms an image on a sheet S using static electricity, and is a tandem type color image forming apparatus which overlaps four color toners of yellow (Y), magenta (M), cyan (C) and black (K). The image forming apparatus 1 is configured with a document conveying portion 10, a sheet accommodating portion 20, an image reading portion 30, an image forming portion 40, an intermediate transfer belt 50, a secondary transfer portion 60, a fixing portion 70, a density sensor 81, and a control substrate 90.

The document conveying portion 10 includes a document feeding stage 11 where a document G is set, a plurality of rollers 12, a conveyance drum 13, a conveyance guide 14, a document ejecting roller 15, and a document receiving tray 16. The document G set on the document feeding stage 11 is conveyed sheet by sheet by the plurality of rollers 12 and the conveyance drum 13 to a reading position of the image reading portion 30. The conveyance guide 14 and the document ejecting roller 15 eject the document G conveyed by the plurality of rollers 12 and the conveyance drum 13, to the document receiving tray 16.

The sheet accommodating portion 20 is disposed in the lower part of an apparatus main body, and a plurality of sheet accommodating portions is provided depending on the sizes and the kinds of the sheet S. The sheet S is fed by a sheet feeding portion 21 to be sent to a conveyance portion 23, and conveyed by the conveyance portion 23 to the secondary transfer portion 60 of a transfer position. Further, a manual insertion portion 22 is provided in the vicinity of the sheet accommodating portion 20. From the manual insertion portion 22, a special sheet set by a user such as a sheet having a size not accommodated in the sheet accommodating portion 20, a tag sheet having a tag, and an OHP sheet is fed to the transfer position.

The image reading portion 30 reads an image on the a document G conveyed from the document conveying portion 10 or an image on a document mounted on a document stage 31 to generate image data. Specifically, the image of the document G is illuminated by a lamp L. Reflected light which is based on the illumination light from the lamp L and is reflected from the document G, is guided by a first mirror unit 32, a second mirror unit 33, and a lens unit 34 in this order, and focused on a light receiving face of an imaging element 35. The imaging element 35 performs photo-electric conversion of the input light and outputs a predetermined image signal. The image signal output from the imaging element 35 is provided with A/D conversion and thereby image data is generated.

Further, the image reading portion 30 includes an image read control portion 36. The image read control portion 36 provides well-known image processing such as shading correction, dither processing, and compression for the image data generated by the A/D conversion, and stores the image data in a RAM (not illustrated) mounted on the control substrate 90. Note that the image data is not limited to the data output from the image reading portion 30 and may be data received from an external apparatus such as a personal computer connected to the image forming apparatus 1 and another image forming apparatus.

The image forming portion 40 and the intermediate transfer belt 50 of an image carrier are disposed between the sheet accommodating portion 20 and the image reading portion 30. The image forming portion 40 has four image forming units of a first to fourth image forming units 40Y, 40M, 40C, and 40K for forming a toner image of yellow (Y), a toner image of magenta (M), a toner image of Cyan (C), and a toner image of back (K) respectively.

The first image forming unit 40Y forms the yellow toner image, and the second image forming unit 40M forms the magenta toner image. Further, the third image forming unit 40C forms the cyan toner image, and the fourth image forming unit 40K forms the black toner image. These four image forming units 40Y, 40M, 40C, and 40K respectively have the same configuration. Accordingly, the first image forming unit 40Y will be explained here.

The first image forming unit 40Y includes a drum-shaped photoreceptor 41 of the image carrier (photoreceptor drum), and a charging portion 42, an exposure portion 43, a development portion 44, and a cleaning portion 45 which are disposed around the photoreceptor 41. The photoreceptor 41 rotates under the drive of an un-illustrated drive motor. The charging portion 42 charges the surface of the photoreceptor 41 uniformly by providing charge to the photoreceptor 41. The exposure portion 43 forms an electrostatic latent image on the photoreceptor 41 by performing exposure for the surface of the photoreceptor 41 using a laser beam, according to the image data read from the document G or transmitted from the external apparatus.

The development portion 44 develops the electrostatic latent image formed on the photoreceptor 41 using two-component developer made of a toner and a carrier. The toner is a particle to form an image. The carrier has the function of providing appropriate charge for the toners by frictional charging in the mixing with the toners inside the development portion 44, the function of carrying the toners to a development region facing the photoreceptor 41, and the function of forming a development electric field so as to cause the toners to develop the electrostatic latent image in high fidelity on the photoreceptor 41. The development portion 44 includes a development sleeve 46 to supply the developer to the photoreceptor 41. The development portion 44 attaches the yellow toners to the electrostatic latent image formed on the photoreceptor 41. Thereby, the yellow toner image is formed on the photoreceptor 41.

Here, a development portion 44 of the second image forming unit 40M attaches the magenta toners to the photoreceptor 41, and a development portion 44 of the third image forming unit 40C attaches the cyan toners to the photoreceptor 41. Then, a development portion 44 of the fourth image forming unit 40K attaches the black toners to the photoreceptor 41.

The cleaning portion 45 removes the toners remaining on the surface of the photoreceptor 41.

The toners attached to the photoreceptor 41 are transferred to the intermediate transfer belt 50 of an intermediate transfer body. The intermediate transfer belt 50 is formed in an endless shape, and wound across a plurality of rollers. The intermediate transfer belt 50 rotates in the direction opposite to the rotation (movement) direction of the photoreceptor 41 under the drive by an un-illustrated drive motor.

In the intermediate transfer belt 50, primary transfer portions 51 are arranged in positions facing the respective photoreceptors 41 of the image forming units 40Y, 40M, 40C and 40K. The primary transfer portion 51 applies a voltage having a polarity opposite to that of toner to the intermediate transfer belt 50, and thereby transfers the toners attached to the photoreceptor 41 to the intermediate transfer belt 50.

Then, by the rotation of the intermediate transfer belt 50, the toner images formed by the four image forming units 40Y, 40M, 40C, and 40K are transferred sequentially onto the surface of the intermediate transfer belt 50. Thereby, the toner images of yellow, magenta, cyan, and black are overlapped and a color image is formed on the intermediate transfer belt 50.

Further, a belt cleaning device 53 is provided in a state of facing the intermediate transfer belt 50. The belt cleaning device 53 cleans the surface of the intermediate transfer belt 50 after the transfer of the toner images to the sheet S is finished.

The secondary transfer portion 60 is disposed in the vicinity of the intermediate transfer belt 50 on the downstream side from the conveyance portion 23 in the sheet conveyance direction. The secondary transfer portion 60 causes the sheet S conveyed by the conveyance portion 23 to contact the intermediate transfer belt 50 and thereby transfers the toner images formed on the outer circumferential surface of the intermediate transfer belt 50 to the sheet S.

The secondary transfer portion 60 includes a secondary transfer roller 61. The secondary transfer roller 61 is pressed to contact a facing roller. Then, the part where the secondary transfer roller 61 and the intermediate transfer belt 50 contact each other forms a secondary transfer nip portion 62. The position of the secondary transfer nip portion 62 is a transfer position where the toner images formed on the outer circumferential surface of the intermediate transfer belt 50 are transferred to the sheet S.

The fixing portion 70 is provided on the ejection side of the sheet S in the secondary transfer portion 60. The fixing portion 70 presses and heats the sheet S to fix the transferred toner images onto the sheet S. The fixing portion 70 is configured with a pair of fixing members; a fixing upper roller 71 and a fixing lower roller 72, for example. The fixing upper roller 71 and the fixing lower roller 72 are disposed in a state pressure-contact to each other, and a fixing nip portion is formed as a pressure welding portion between the fixing upper roller 71 and the fixing lower roller 72.

A heating portion is provided inside the fixing upper roller 71. The roller portion of the fixing upper roller 71 is heated by radiation heat from the heating portion. Then, the heat of the roller portion in the fixing upper roller 71 is transferred to the sheet S and thereby the toner image is fixed onto the sheet S.

The sheet S is conveyed so as to cause the face onto which the toner image is transferred by the secondary transfer portion 60 (fixing target face) to face the fixing upper roller 71, and passes through the fixing nip portion. Accordingly, the pressing by the fixing upper roller 71 and the fixing lower roller 72, and the heating with the heat from the roller portion of the fixing upper roller 71, are performed for the sheet S passing through the fixing nip portion.

A switching gate 24 is disposed on the downstream side from the fixing portion 70 in the conveyance direction of the sheet S. The switching gate 24 switches the conveyance path of the sheet S which has passed through the fixing portion 70. That is, the switching gate 24 causes the sheet S to travel straight in the case of ejection with the image side facing up in the image formation on one face of the sheet S. Thereby, the sheet S is ejected by a pair of sheet ejection rollers 25. Further, the switching gate 24 guides the sheet S downward in the case of ejection with the image side facing down in the image formation on one face of the sheet S or in the case of the image formation on both sides of the sheet S.

In the case of ejection with the image side facing down, after the sheet S is guided downward by the switching gate 24, the sheet S is turned over by a sheet reverse conveyance portion 26 and conveyed upward. Thereby, the turned-over sheet S is ejected by the pair of sheet ejection rollers 25. In the case of the image formation on both sides of the sheet S, after the sheet S is guided downward by the switching gate 24, the sheet S is turned over by the sheet reverse conveyance portion 26. Then, the turned-over sheet S is sent to the transfer position again by a re-feed path 27.

The density sensor 81 is provided in the state facing the belt face of the intermediate transfer belt 50. The density sensor 81 detects the density of a pattern formed on the intermediate transfer belt 50 for detecting the periodic non-uniformity (periodic density non-uniformity of an image). That is, the density sensor 81 is an example of the density measuring portion to measure the periodic density non-uniformity of the image caused in the sub-scan direction perpendicular to the main scan direction. Here, the "main scan direction" means a scan direction when the electrostatic latent image is formed on the photoreceptor 41 by the laser beam (i.e., axis direction of the photoreceptor 41), and the "sub-scan direction" means the rotation direction of the photoreceptor 41 (i.e., conveyance direction of the sheet S).

A post processing apparatus may be disposed on the downstream side from the pair of sheet ejection rollers 25 to perform the folding of the sheet S, staple processing for the sheet S, or the like.

[Hardware Configuration of each Portion in the Image Forming Apparatus]

Figure 2:
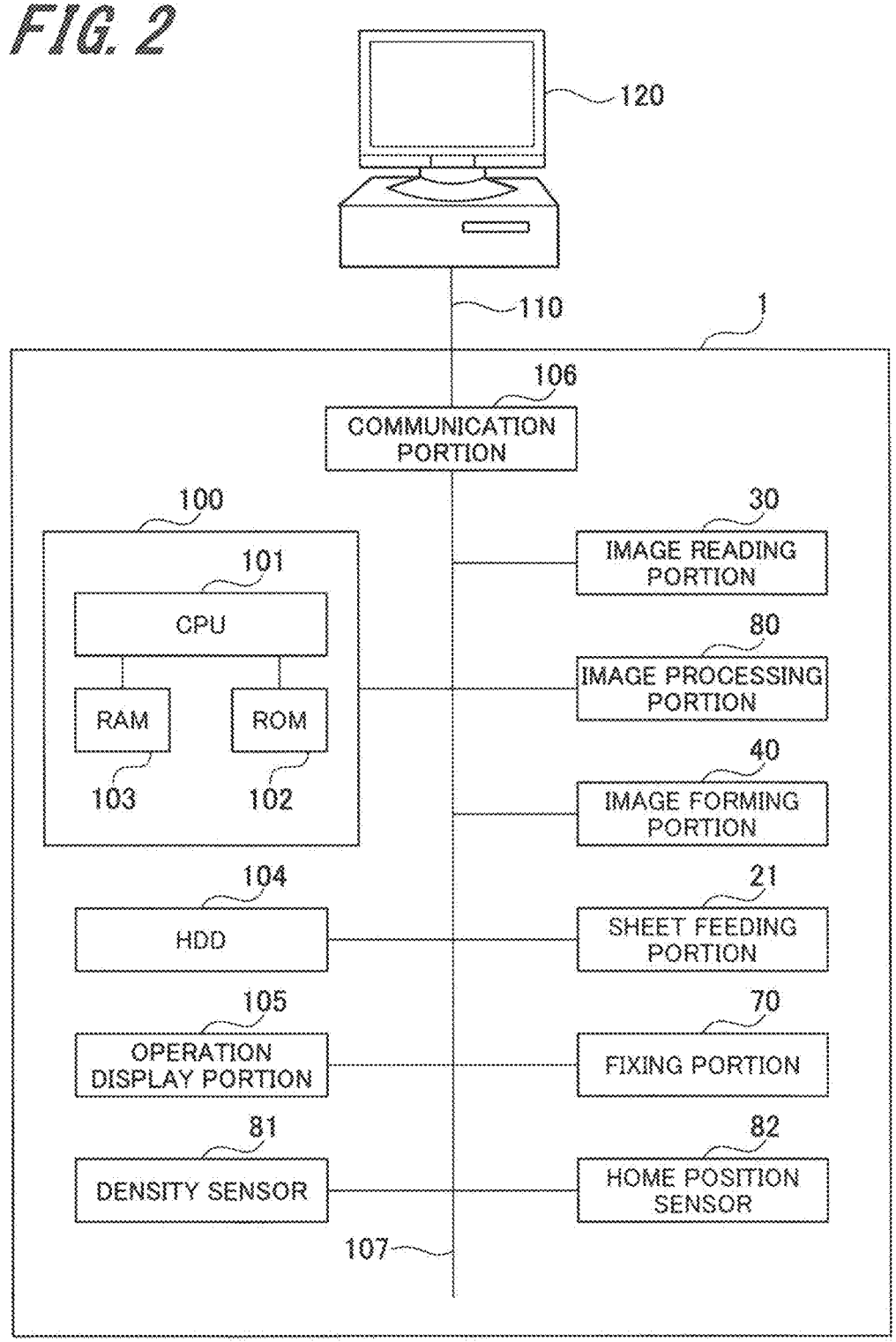
FIG. 2 is a block diagram to show a hardware configuration example of each portion in an image forming apparatus according to an embodiment of the present invention.

Next, a hardware configuration of each portion in the image forming apparatus 1 will be explained with reference to FIG. 2. FIG. 2 is a block diagram to show a hardware configuration example of each portion in the image forming apparatus 1.

As shown in FIG. 2, the image forming apparatus 1 is provided with a control portion 100. The control portion 100 is configured on the above described control substrate 90 (refer to FIG. 1).

The control portion 100 includes a CPU (Central Processing Unit) 101, a ROM (Read Only Memory) 102 for storing a program or the like to be executed by the CPU 101, and a RAM (Random Access Memory) 103 to be used as a work area of the CPU 101, for example. Here, an electrically-erasable programmable ROM can be used generally as the ROM 102, for example.

The CPU 101 is used as an example of a computer to control the whole image forming apparatus 1. The CPU 101 is connected with each of an HDD (Hard Disk Drive) 104, an operation display portion 105, and a communication portion 106 via a system bus 107. Further, the CPU 101 is connected with each of the image reading portion 30, an image processing portion 80, the image forming portion 40, the sheet feeding portion 21, the fixing portion 70, the density sensor 81, and a home position sensor 82 via the system bus 107. Details of the home position sensor 82 will be described below.

The HDD 104 stores the image data of a document image read by the image reading portion 30 and stores output image data or the like, and is used as an example of the computer-readable recording medium storing a program executed by the image forming apparatus 1. Here, the computer-readable recording medium storing the program executed by the image forming apparatus 1 is not limited to the HDD 104, and may be a recording medium such as a CD-ROM and a DVD-ROM, for example. The operation display portion 105 is a touch panel configured with a display such as a liquid crystal display device (LCD) and an organic ELD (Electro Luminescence Display). The operation display portion 105 displays an instruction menu for a user and information about the obtained image data, or the like. Further, the operation display portion 105 is provided with a plurality of keys, and receives data input by user's key operation such as various kinds of instruction, characters, and numerals and outputs the input signal to the control portion 100.

The communication portion 106 receives job information transmitted from a PC (personal computer) 120 which is an external information processing apparatus via a communication line 110. Then, the communication portion 106 sends the received job information to the control portion 100 via the system bus 107. The job information includes image data of an image to be formed, and information associated with the image data such as the kind of the sheet to be used and the number of sheets to be used.

Note that, while the example of applying the personal computer as an external apparatus is explained in the present embodiment, the present embodiment is not limited to the example, and another kind of apparatus such as a facsimile apparatus, for example, can be applied as the external apparatus.

The image reading portion 30 reads the document image optically and performs conversion into an electrical signal. For example, in the case of reading a color document, the image reading portion 30 generates image data having luminance information of 10 bit gradations for each of RGB per pixel. The image data generated by the image reading portion 30, or the image data transmitted from the PC 120 which is an example of an external apparatus connected to the image forming apparatus 1 is sent to the image processing portion 80 and submitted to the image processing. The image processing portion 80 performs processing such as analog processing, A/D conversion, shading correction, image compression, and periodic non-uniformity (periodic density non-uniformity of an image) correction for the received image data.

For example, in the case of forming a color image in the image forming apparatus 1, the RGB image data generated by the image reading portion 30 or the like is input into a color conversion LUT (Look Up Table) in the image processing portion 80. Then, the image processing portion 80 performs color conversion of the RGB data into YMCK image data. Then, the image processing portion performs gradation reproduction characteristic correction, screen processing of dots or the like with reference to a density correction LUT, edge processing for emphasizing a fine line, or the like, for the image data after the color conversion. Details of the periodic non-uniformity correction will be described below.

The control portion 100 controls the whole image forming apparatus 1 under the control of the CPU 101 which reads the recording medium storing the program. Specifically, the control portion 100 drives and controls the image forming portion 40 to form a toner image for image density control or a toner image for image formation, and to perform the primary transfer to the intermediate transfer belt 50. Further, the control portion 100 drives and controls the secondary transfer portion 60 to perform the secondary transfer of the toner image carried by the intermediate transfer belt 50 to the sheet S. Furthermore, the control portion 100 drives and controls the fixing portion 70 to press and heat the sheet S and to fix the toner image onto the sheet S.

[Mechanism of Periodic Non-uniformity Correction]

Figure 3:
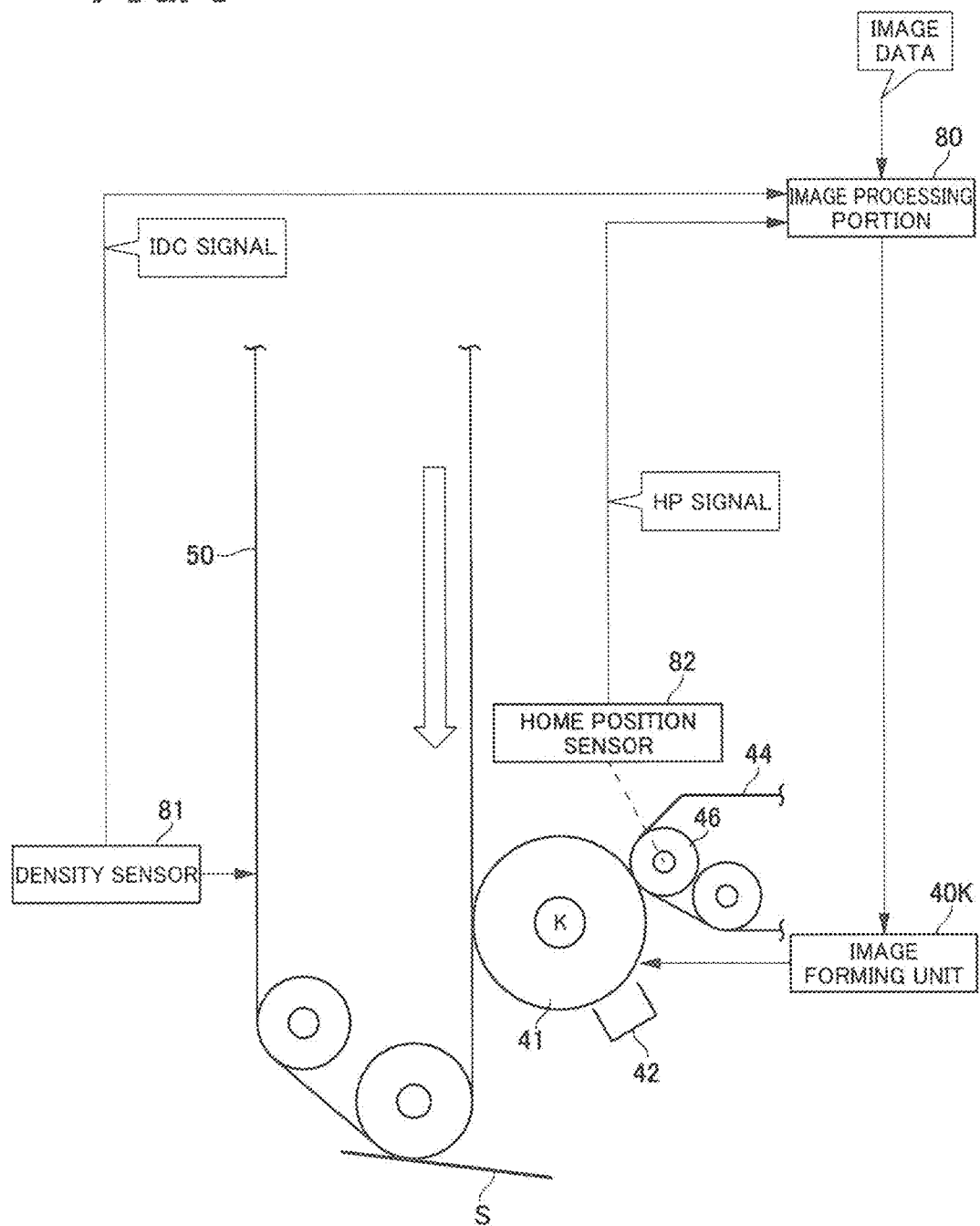
FIG. 3 is a schematic diagram of a mechanism necessary for periodic non-uniformity correction.

In the image forming apparatus 1 of the electro-photographic type having the above configuration, sometimes the periodic non-uniformity (periodic density non-uniformity of an image) is caused in the conveyance direction of the sheet S (sub-scan direction) by the rotation period non-uniformity of the rotary component such as the photoreceptor (photoreceptor drum) 41 and the development sleeve 46 which are used in the image forming process. The correction of the periodic non-uniformity is performed in the image processing portion 80. The mechanism of the periodic non-uniformity correction executed in the image processing portion 80 will be explained by the use of FIG. 3. FIG. 3 is a schematic diagram of a mechanism necessary for the periodic non-uniformity correction. Here, the case where the rotary component which is a correction target is the development sleeve 46 will be explained, as an example.

The home position sensor 82 is attached to the development sleeve 46. For example, the home position sensor 82 is an example of the reference position detection portion to detect the reference position of the development sleeve 46 anywhere in one round of the development sleeve 46. A well-known configuration of combining a light reflector fixed to the rotation axis of the development sleeve 46 and a photo-coupler can be used for the home position sensor 82, for example. A home position signal (in the following, described as "HP signal") detected by the home position sensor 82 is supplied to the image processing portion 80.

The density (image density control) sensor 81 provided in the state of facing the belt face of the intermediate transfer belt 50 is also used for the periodic non-uniformity correction. In the periodic non-uniformity correction, a pattern having a uniform gradation in the sub-scan direction (sheet conveyance direction) is formed on the intermediate transfer belt 50 under the control of the control portion 100. The density sensor 81 detects the density of the pattern formed on the intermediate transfer belt 50 for the periodic non-uniformity correction. The density signal (in the following, described as "IDC signal") detected by the density sensor 81 is supplied to the image processing portion 80.

The image processing portion 80 performs the periodic non-uniformity correction using the HP signal which is the detection result of the home position sensor 82, and the IDC signal which is the detection result of the density sensor 81. Details of the periodic non-uniformity correction will be described below.

[Speed Control of the Rotary Component]

In the image forming apparatus 1 of the electro-photographic type, the speed control of the rotary component such as the photoreceptor (photoreceptor drum) 41 and the development sleeve 46 is performed under the control of the control portion 100. The speed control of the rotary component includes linear speed control according to the basic paper weight, development θ (rotational speed ratio of the rotary component with respect to process linear speed) control according to a process state, and the like, for example. By such speed control, the appearance of the periodic non-uniformity (periodic density non-uniformity of an image) caused by the rotary component is changed.

Specifically, the appearance of the periodic non-uniformity in the density measurement by the density sensor 81 is changed by three points of the period, the amplitude, and the phase of the periodic non-uniformity in the rotary component. As an example, when the development θ is changed in three steps of θ=1.6, θ2=1.8, and θ3=2.2, the state of the change in the period, the amplitude, and the phase of the periodic non-uniformity caused by the development sleeve 46 will be explained by the use of FIG. 4, FIG. 5, and FIGS. 6A-6C.

(1) Period Change

When the rotation of the rotary component which is the correction target becomes faster, the period (interval of HP signal) becomes smaller as shown in FIG. 4.

(2) Amplitude Change

Qualitatively, developability is increased as the rotation speed of the development sleeve 46 is increased, and therefore the periodic non-uniformity tends to be stable, and the intensity of the non-uniformity, that is, the amplitude becomes smaller as shown in FIG. 4.

(3) Phase Change

Figure 6A:
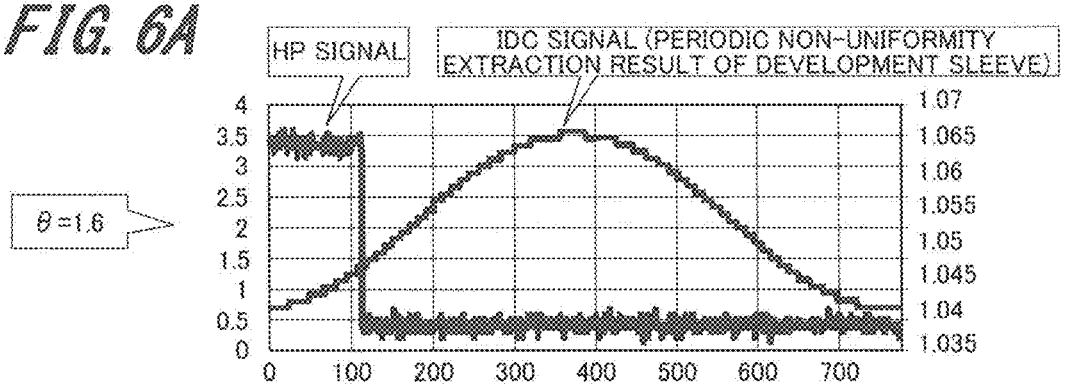
FIGS. 6A-6C are waveform charts to show a state in which the phase of periodic non-uniformity changes in development sleeve when development θ is changed.
Figure 6B:
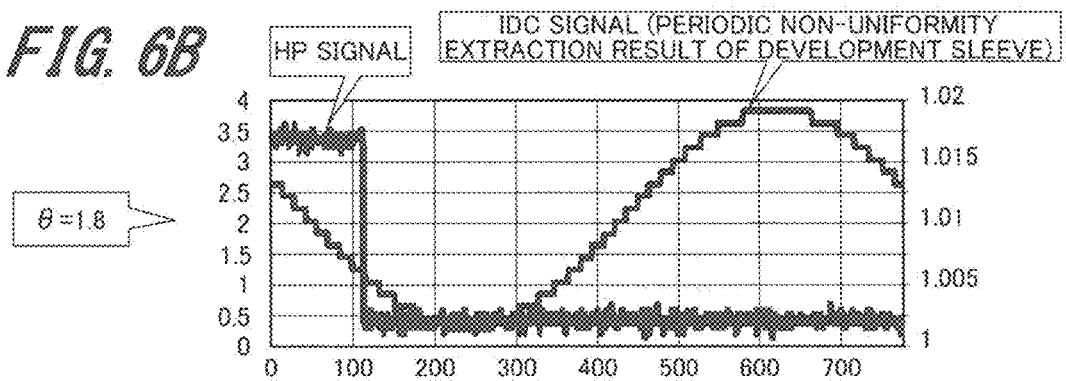
Figure 6C:
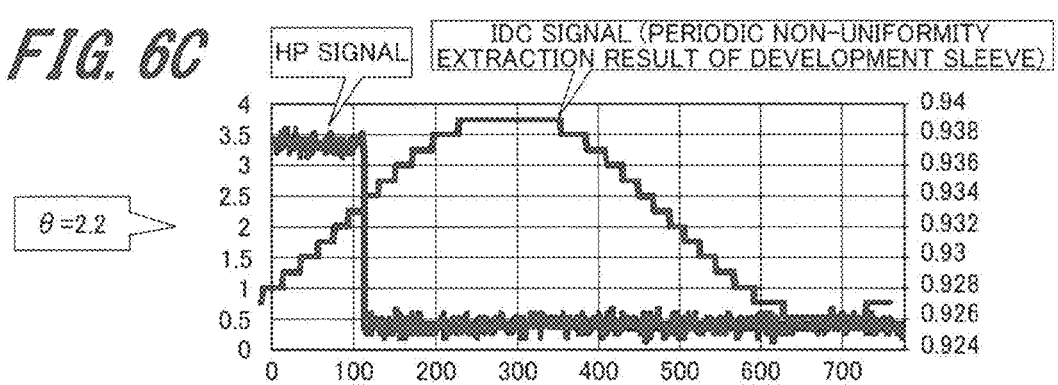

Because of the mechanism of the periodic non-uniformity correction (refer to FIG. 3), a predetermined time is required until data to correct the periodic non-uniformity in the image processing portion 80 actually reaches the development sleeve 46 which causes the periodic non-uniformity. That is, actually, as shown in FIG. 5, the correction value is applied at a position on the circumference which is moved by the rotation within a certain time from the timing of the HP signal received by the image processing portion 80. Then, when the rotational speed of the development sleeve 46 is changed, the rotation amount within the certain time changes and therefore the phase shifts as shown in FIGS. 6A-6C.

As apparent from the above, when the speed control of the rotary component causing the periodic non-uniformity is performed, where a correction value before the speed change is applied as it is, a desirable correction effect is not obtained for the periodic non-uniformity correction.

Figure 7:
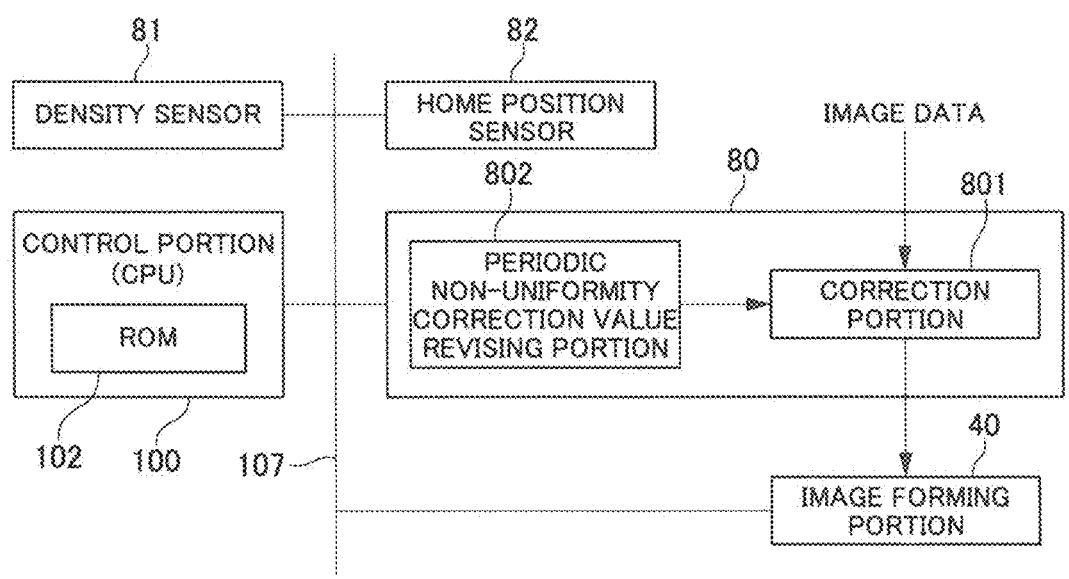
FIG. 7 is a block diagram to show a configuration outline of a periodic non-uniformity correction system carried out centering an image processing portion.

Accordingly, in the image forming apparatus 1 according to the present embodiment, the following method is employed for the periodic non-uniformity correction. The periodic non-uniformity correction is performed in the image processing portion 80 (refer to FIG. 2 and FIG. 3). FIG. 7 shows a configuration outline of the periodic non-uniformity correction system carried out centering the image processing portion 80.

As shown in FIG. 7, the periodic non-uniformity correction system carried out centering the image processing portion 80 is configured with the density sensor 81 which is an example of the density measuring portion, the home position sensor 82 which is an example of the reference position detecting portion, and the control portion 100, in addition to the image processing portion 80. As explained also in FIG. 2, the image processing portion 80, the density sensor 81, the home position sensor 82, and the control portion 100 are connected with each other via the system bus 107.

Here, the periodic non-uniformity change accompanying the change of the development θ by the speed control will be explained by the use of an example. As described above, the speed control is carried out under the control of the control portion 100. Accordingly, the control portion 100 can provide the information of the development θ and the information about the change of the development θ, for the image processing portion 80. In other words, the image processing portion 80 can obtain the information of the development θ and the information about the change of the development θ, from the control portion 100.

In the periodic non-uniformity correction, first, a correction value for the periodic non-uniformity correction (in the following, described as "periodic non-uniformity correction value") is set preliminarily under the control of the control portion 100. Specifically, the control portion 100 preliminarily sets parameters for correction value revisions corresponding to the appearances of the periodic non-uniformity for the respective θ values after the change of the development θ, on the basis of the HP signal which is the detection result of the home position sensor 82 and the IDC signal which is the detection result of the density sensor 81, and stores the parameters as a table (in the following, described as "correction value revision parameter table"). That is, the control portion 100 has a function as the periodic non-uniformity correction value setting portion to set a periodic non-uniformity correction value on the basis of the measurement result of the density sensor 81 and the detection result of the home position sensor 82. While the storage portion to store the correction value revision parameter table is not limitative, the ROM 102 of the control portion 100 can be used.

The image processing portion 80 includes a correction portion 801 to correct the image formation parameter using the periodic non-uniformity correction value, and a periodic non-uniformity correction value revising portion 802 to revise the periodic non-uniformity correction value when the development θ is changed. The correction portion 801 corrects the image formation parameter, specifically, the gradation using the information of the development θ provided from the control portion 100 and using the periodic non-uniformity correction value corresponding to the development θ. At this time, the periodic non-uniformity correction value corresponding to the development θ is preliminarily set, and assumed to be stored in a storage area different from the storage area of the correction value revision parameter table in the ROM 102 (or another storage portion different from the ROM 102), for example. Then, image data having the gradation corrected in the correction portion 801 is supplied to the image forming portion 40, and thereby the image formation is performed using the image data.

Here, when the speed control, for example, the control of the development θ is performed according to a process state under the control of the control portion 100, the periodic non-uniformity appears differently according to the change of the speed in the development sleeve 46. Accordingly, in the image processing portion 80, the periodic non-uniformity correction value revising portion 802 revises the periodic non-uniformity correction value according to the changed speed when the development θ is changed. More specifically, the periodic non-uniformity correction value revising portion 802 obtains a periodic non-uniformity correction value corresponding to the changed development θ from the correction value revision parameter table stored in the ROM 102, and sets the periodic non-uniformity correction value as a new correction value.

The correction portion 801 corrects the gradation using the periodic non-uniformity correction value after the revision in the periodic non-uniformity correction value revising portion 802. Then, the image data having the gradation corrected in the correction portion 801 is supplied to the image forming portion 40, and thereby the image formation (printing) is performed using the gradation (image formation parameter) determined by the periodic non-uniformity correction value after the revision in the periodic non-uniformity correction value revising portion 802. In this manner, when the speed of the development sleeve 46 is changed, by revising the periodic non-uniformity correction value according to the changed speed and performing the image formation using the gradation determined by the periodic non-uniformity correction value after the revision, it becomes possible to handle the speed control of the rotary component. That is, even when the periodic non-uniformity is changed accompanying the speed control of the rotary component (development sleeve 46 in the present example), a desirable correction effect of handling the change of the periodic non-uniformity may be obtained for the periodic non-uniformity correction.

A flow of a series of processing steps in the above configured periodic non-uniformity correction system will be explained along the flowchart of FIG. 8. Note that the series of processing steps in the periodic non-uniformity correction system can be understood as an image formation method of the present invention.

Note that, in advance of the present processing, the periodic non-uniformity correction value corresponding to the speed of the rotary component and the correction value revision parameter table which includes the periodic non-uniformity correction values corresponding to the respective speeds when the speed of the rotary component is changed are assumed to be stored preliminarily in the ROM 102.

The image processing portion 80 obtains the speed information of the rotary component which is the correction target from the control portion 100 (step S1), and determines whether or not the rotational speed of the rotary component is changed, from the information about the change of the rotational speed which is obtained similarly from the control portion 100 (step S2). When the rotational speed of the rotary component is determined to be changed (YES in S2), in the image processing portion 80, the periodic non-uniformity correction value revising portion 802 refers to the correction value revision parameter table stored in the ROM 102 (step S3) and obtains a periodic non-uniformity correction value corresponding to the rotational speed after the change from the correction value revision parameter table.

Then, the periodic non-uniformity correction value revising portion 802 sets the periodic non-uniformity correction value obtained from the correction value revision parameter table as a new periodic non-uniformity correction value corresponding to the rotational speed (step S4). Next, the correction portion 801 corrects the gradation which is the image formation parameter of the image data using the periodic non-uniformity correction value revised (set) in the periodic non-uniformity correction value revising portion 802 (step S5), and supplies the image data after the correction to the image forming portion 40. Thereby, printing operation (image formation operation) is carried out in the image forming portion 40 (step S6). Here, the image processing portion 80 moves to step S5 when the rotational speed of the rotary component is determined not to be changed in step S2 (NO in S2), and executes the periodic non-uniformity correction using the existing periodic non-uniformity correction value without revising the periodic non-uniformity correction value.

In the following, a specific Example will be explained for the periodic non-uniformity correction carried out in the image processing portion 80 of the image forming apparatus 1 according to the present embodiment.

Example 1

In Example 1, for handling the change of the periodic non-uniformity accompanying the change of the development 19, the parameters corresponding to the appearances of the periodic non-uniformity for respective θ values after the change of the development θ are stored preliminarily in the ROM 102 (refer to FIG. 7), for example, as the correction value revision parameter table. Then, in the change of the development θ, the parameter corresponding to the development θ after the change is provided to be obtained from the correction value revision parameter table, and set (revised) to be the periodic non-uniformity correction value corresponding to the development θ.

Specifically, as shown in FIG. 9, the periodic non-uniformity correction values corresponding to one period of the periodic non-uniformity are stored as the correction value revision parameter table, and the periodic non-uniformity correction value is provided to be applied in synchronization with the timing of the HP signal which is the detection result of the home position sensor 82. As described above, when the development θ is changed, the appearance of the periodic non-uniformity changes in the points of the period, the amplitude, and the phase, and therefore the parameters for the correction value revision in the case of a certain development θ are preliminarily stored as the correction value revision parameter table.

FIG. 10 is a diagram to show an example of the correction value revision parameter table. The correction value revision parameter table of FIG. 10 shows association relationships between the development θ values (θ1, θ2, and θ3) changed in the speed control by the control portion 100 and the parameters (period, amplitude, and phase) for the correction value revision corresponding to the development θ after the change. In the example, the development θ is increased from θ1 to θ3, that is, the rotational speed of the development sleeve 46 is increased.

The generation of each parameter value in the table may be performed by actual measurement, or may be performed by calculation. For example, when the diameter Φ of the development sleeve 46 is known, the period T can be obtained from following formula (1).

$$T = \pi \Phi / \theta \quad (1)$$

Here, T indicates the period [mm], Π indicates the ratio of a circumference of a circle to a diameter, Φ indicates the diameter [mm] of the development sleeve 46, and θ indicates the ratio of the rotational speed of the development sleeve 46 with respect to the process linear speed.

Further, the change in the phase can be obtained by calculation. If the time from a time point when the HP signal is received by the image processing portion 80 until the latent image formed by laser beam drawing on the photoreceptor 41 reaches the development sleeve 46 is known, the rotation amount of the development sleeve 46 within the time at certain θ can be calculated. At this time, by obtaining a difference in the rotation amount between certain θ and different θ', the change of the phase can be calculated.

When the time until the latent image formed on the photoreceptor 41 reaches the development sleeve 46 is denoted by t [sec] and the change of the phase is denoted by X [mm], the change of the phase X can be obtained from following formula (2)

$$X = \{(V\theta t) - (V\theta' t)\} \bmod C \quad (2)$$

Here, V indicates the process linear speed [mm/sec], C indicates circumference length [mm] of the development sleeve 46, and mod indicates a sign expressing remainder calculation.

Figure 11A:
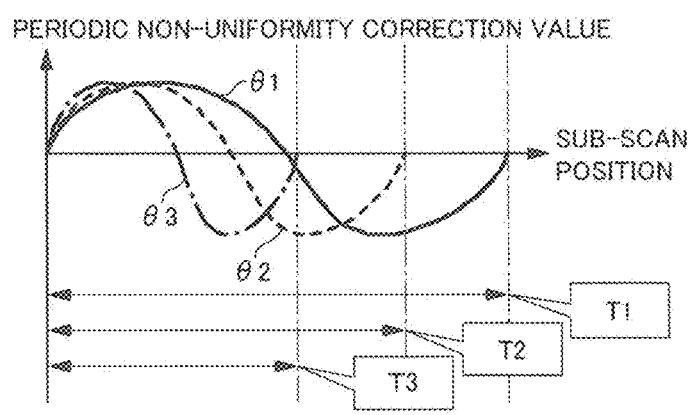
FIGS. 11A-11C are diagrams for explaining periodic non-uniformity correction value revision corresponding to current development θ.
Figure 11B:
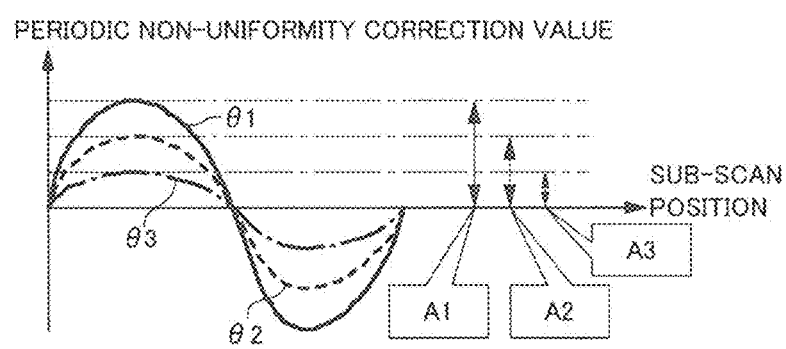
Figure 11C:
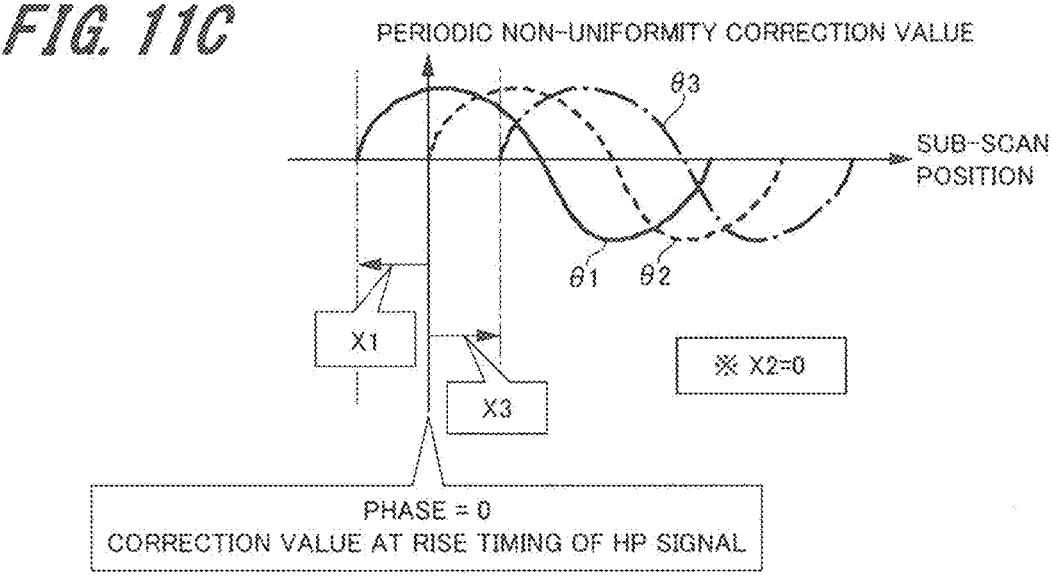

After the correction value revision parameter table (refer to FIG. 10) is generated for respective θ cases, the periodic non-uniformity correction value corresponding to the current development θ is revised for application. The revision of the periodic non-uniformity correction value corresponding to the current development θ will be explained by the use of FIGS. 11A-11C. FIG. 11A shows the case of the period revision, FIG. 11B shows the case of the amplitude revision, and FIG. 11C shows the case of the phase revision. In FIG. 11A, FIG. 11B, and FIG. 11C, revised correction value curves are shown by solid lines in the case of θ1, broken lines in the case of θ2, and chain lines in the case of θ3, respectively.

In the case of FIG. 11A (period), it is determined which period non-uniformity correction value is applied from a certain rise to the next rise of the HP signal, according to the correction value revision parameter table (refer to FIG. 10).

In the case of FIG. 11B (amplitude), the magnitude of the periodic non-uniformity value is revised according to the correction value revision parameter table (refer to FIG. 10). For example, since the intensity of the periodic non-uniformity becomes smaller as the rotational speed of the development sleeve 46 is increased (19 is increased), the magnitude of the periodic non-uniformity correction value is made smaller according to the increase. Qualitatively, when the rotational speed of the development sleeve 46 is increased with respect to the photoreceptor 41, the amount of the toner to contact the surface of the photoreceptor 41 becomes larger, and therefore the developability is increased and the stability is improved. As a result, the intensity of the periodic non-uniformity is reduced.

In the case of FIG. 11C (phase), the parameter is applied so as to shift the whole phase of the non-uniformity correction value according to the phase shift amount stored in the correction value revision parameter table (refer to FIG. 10). For example, the periodic non-uniformity correction value to be applied to the rise timing of the HP signal is focused. In FIG. 11C, the point where the horizontal axis (X axis) and the vertical axis (Y axis) cross each other is assumed to express a periodic non-uniformity correction value to be applied at the rise of the HP signal.

In the case of θ1, the phase is shifted by a shift amount X1, and a periodic non-uniformity correction value at the shifted point is applied. In the case of θ3, the phase is shifted by a shift amount X3, and a periodic non-uniformity correction value at the shifted point is applied. Note that, while the rise point of the HP signal is focused here, the periodic non-uniformity correction value is similarly applied also at another position.

While the above shows the state of revising the parameters of the period, the amplitude, and the phase when the speed of the rotary component is changed, actually, the periodic non-uniformity correction value to be applied is determined by the combination of the revision of these parameters.

Example 2

While Example 1 shows a revision example of the periodic non-uniformity correction value when the development θ is changed, also when the process linear speed is changed, the periodic non-uniformity correction value can be revised by applying a method similar to that of Example 1. FIG. 12 shows an example of a correction value revision parameter table expressing linear speed dependence. The correction value revision parameter table shown in FIG. 12 expresses an association relationships between the process linear speeds (V1, V2, and V3) changed in the speed control by the control portion 100 and the parameters (period, amplitude, and phase) for the correction value revision corresponding to the process linear speed after the change.

Further, also when the change of the development θ and the change of the process linear speed are combined, the periodic non-uniformity correction value can be revised by preparing parameters for the respective cases as a table. FIGS. 13A-13C show an example of a correction value revision parameter table in the case of combining the change of the development θ and the change of the process linear speed.

Moreover, also when the correction target is a rotary component such as the photoreceptor 41 or the intermediate transfer belt 50 of the intermediate transfer body, a similar method may be applied to the appearance of the periodic non-uniformity accompanying the change of the process linear speed. When the correction target is the photoreceptor 41, processing is performed to revise the periodic non-uniformity correction value originating in the photoreceptor 41 according to the change of the process linear speed. When the correction target is the intermediate transfer belt 50, processing is performed to revise the periodic non-uniformity correction value originating in the intermediate transfer belt 50 according to the change of the process linear speed.

Example 3

Figure 14:
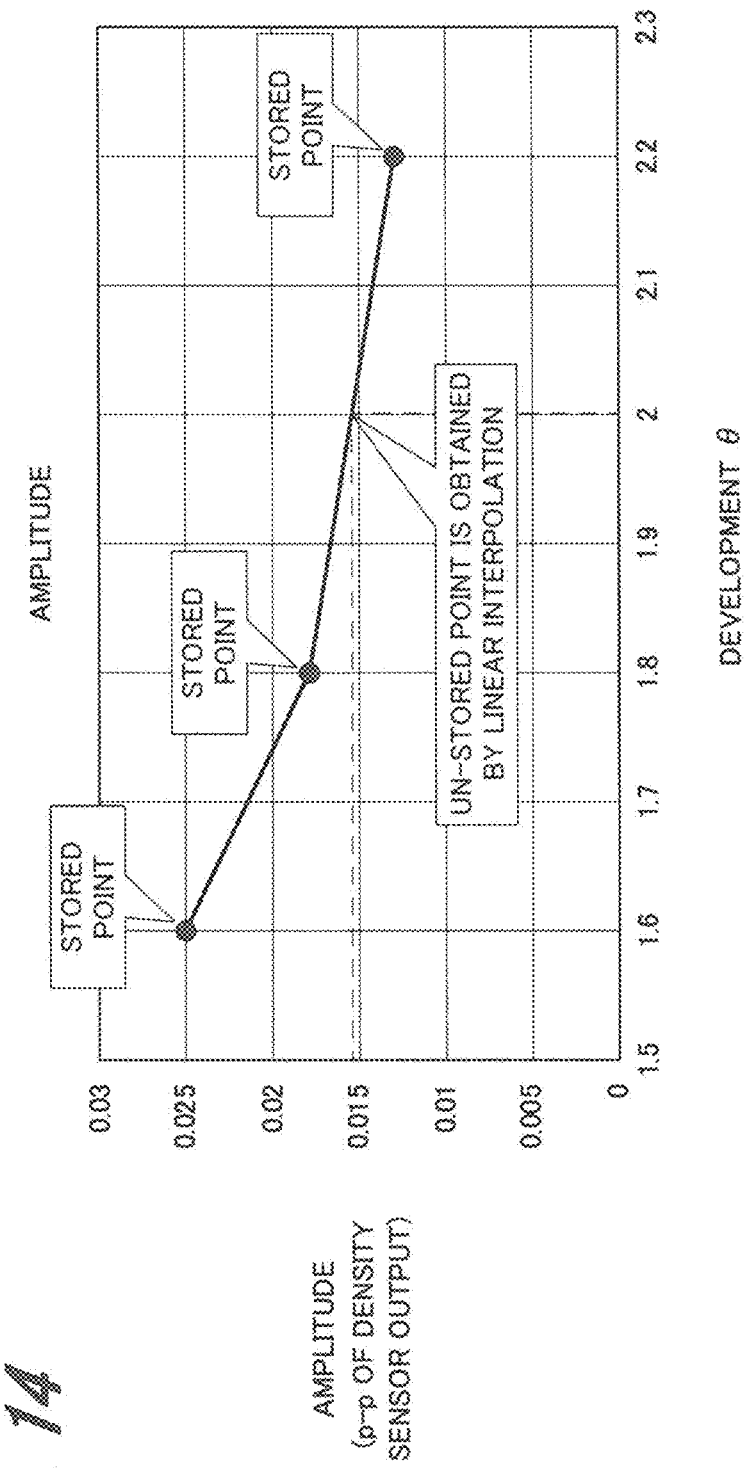
FIG. 14 is a diagram to show a state of obtaining a parameter which is not stored in a correction value revision parameter table, by linear interpolation for amplitude.

While each of Example 1 and Example 2 shows the example of preliminarily storing the parameters after the revision when the rotational speed is changed, the parameter after the revision can be obtained by linear interpolation from the preliminarily stored parameters. FIG. 14 shows the state of obtaining a parameter which is not stored in the correction value revision parameter table by the linear interpolation, for the amplitude. Here, FIG. 14 shows an example of obtaining an un-stored amplitude parameter in the case of θ=2.0, for example, from the preceding and succeeding amplitudes (θ=1.8 and θ=2.2), when actual measurement is performed in the cases of θ=1.6, θ=1.8, and θ=2.2, and a correction value revision parameter table is generated.

The above processing, that is, the processing of obtaining a periodic non-uniformity correction value corresponding to a changed speed which is not stored in the ROM 102 used as an example of the storage portion, by the linear interpolation from periodic non-uniformity correction values corresponding to changed speeds which are stored in the ROM 102, is carried out by the periodic non-uniformity correction value revising portion 802 in the image processing portion 80. Note that it is an example that the processing is performed by the periodic non-uniformity correction value revising portion 802, and the processing can also be performed by the control portion 100, for example.

Example 4

The amplitude of the periodic non-uniformity could change with time. The causes thereof include the variation of the charge amount, the variation in the conveyance amount of the developer, and the like. When the amplitude of the periodic non-uniformity changes with time, it is possible to perform more appropriate correction when a periodic non-uniformity correction value is newly generated. In this case, from the variation of the preliminarily stored periodic non-uniformity correction value at a certain rotational speed, the variation of the periodic non-uniformity correction value at another rotational speed may be obtained by prediction, and the periodic non-uniformity correction value may be changed. For example, when the amplitude A1 at θ1 is assumed to increase in 1.5 times from a previous value (non-uniformity is deteriorated), since the development sleeve 46 causing the non-uniformity is the same even if the development θ is changed, it is predicted that the non-uniformity at another development θ of θ2 also increases. Accordingly, the amplitude A2 at θ2 is predicted to have the same level deterioration ratio, and therefore is changed to a 1.5 time larger value to be stored.

The above described processing, that is, the processing of revising a periodic non-uniformity correction value corresponding to another changed speed which is stored in the ROM 102 of an example of the storage portion, according to the chronological change of a periodic non-uniformity correction value corresponding to the changed speed which is stored in the ROM 102, is carried out by the periodic non-uniformity correction value revising portion 802 of the image processing portion 80. Note that it is an example that the processing is performed by the periodic non-uniformity correction value revising portion 802, and the processing can also be performed by the control portion 100, for example.

Variation Example

While the present invention has been explained by the use of the embodiment in the above, the present invention is not limited to the range described in the above embodiment. That is, various modifications or improvements can be added to the above embodiment within the range without departing from the spirit of the present invention, and modes in which such modifications or improvements are added fall within the technical range of the present invention.

For example, while the above embodiment exemplifies the copy machine as the image forming apparatus 1 according to one embodiment of the present invention, the present invention is not limited to the application example. That is, the present invention is applicable to all the electro-photographic type image forming apparatuses such as a printer apparatus, a facsimile apparatus, a printing machine, and a composite machine, other than the copy machine.

REFERENCE NUMERALS LIST 1 image forming apparatus
10 document conveying portion
20 sheet accommodating portion
30 image reading portion
40 image forming portion
41 photoreceptor
44 development portion
46 development sleeve
50 intermediate transfer belt
51 primary transfer portion
60 secondary transfer portion
70 fixing portion
80 image processing portion
81 density sensor (density measuring portion)
82 home position sensor (reference position detection portion),
100 control portion
801 correction portion
802 periodic non-uniformity correction value revising portion

What is claimed is:

1. An image forming apparatus, comprising:
a density measuring portion configured to measure a periodic density non-uniformity of an image caused in a sub-scan direction perpendicular to a main scan direction;
a reference position detecting portion configured to detect a reference position of a rotary component which is a correction target;
a periodic non-uniformity correction value setting portion configured to set a periodic non-uniformity correction value based on a measurement result of the density measuring portion and a detection result of the reference position detecting portion;
a correction portion configured to correct an image formation parameter using the periodic non-uniform correction value, wherein;
image formation is performed using the image formation parameter corrected by the correction portion, and;
a periodic non-uniformity correction value revising portion configured to revise the periodic non-uniformity correction value when speed of the rotary component is changed, according to the changed speed, wherein;
the image formation is performed using the image formation parameter which is determined by a periodic non-uniformity correction value after revision in the periodic non-uniformity correction value revising portion,
wherein the rotary component is a development sleeve, and wherein;
the periodic non-uniformity correction value revising portion revises the periodic non-uniformity correction value originating in the development sleeve, according to change of a rotational speed ratio of the development sleeve with respect to process linear speed.

2. The image forming apparatus according to claim 1, wherein:
the periodic non-uniformity correction value revising portion revises the periodic non-uniformity correction value so as to cause an amplitude parameter thereof to have a smaller value when the rotational speed ratio of the development sleeve with respect to the process linear speed is changed so as to become larger.

3. The image forming apparatus according to claim 1, wherein;
the periodic non-uniformity correction value revising portion revises the periodic non-uniformity correction value so as to cause an amplitude parameter thereof to have a larger value when the rotational speed ratio of the development sleeve with respect to the process linear speed is changed so as to become smaller.

4. A non-transitory computer-readable recording medium storing a computer program of a computer provided for an image forming apparatus:
the image forming apparatus comprising;
a density measuring portion configured to measure a periodic density non-uniformity of an image caused in a sub-scan direction perpendicular to a main scan direction;
a reference position detecting portion configured to detect a reference position of a rotary component which is a correction target;
a periodic non-uniformity correction value setting portion configured to set a periodic non-uniformity correction value based on a measurement result of the density measuring portion and a detection result of the reference position detecting portion, and;
a correction portion configured to correct an image formation parameter using the periodic non-uniform correction value, wherein;
the computer provided for the image forming apparatus which performs image formation using the image formation parameter corrected by the correction portion, stores;
the computer program causing the computer to execute processing comprising;
a periodic non-uniformity correction value revision step of revising the periodic non-uniformity correction value when speed of the rotary component is changed, according to the changed speed, and;
a step of performing image formation using the image formation parameter which is determined by a periodic non-uniformity correction value after revision in the periodic non-uniformity correction value revision step,
wherein the rotary component is a development sleeve, and wherein:
a computer program is further stored for executing the step of revising the periodic non-uniformity correction value originating in the development sleeve according to change in a rotational speed ratio of the development sleeve with respect to process linear speed.

5. The non-transitory computer-readable recording medium storing the program according to claim 4, wherein;
a computer program is further stored for executing the step of revising the periodic non-uniformity correction value so as to cause an amplitude parameter thereof to have a smaller value when a rotational speed ratio of the development sleeve with respect to the process linear speed is changed so as to become larger.

6. The non-transitory computer-readable recording medium storing the program according to claim 4, wherein;
a computer program is further stored for executing the step of revising the periodic non-uniformity correction value so as to cause an amplitude thereof to have a larger value when the rotational speed ratio of the development sleeve with respect to the process linear speed is changed so as to become smaller.

* * * * *